(12) United States Patent
Maness (10) Patent No.: US 7,669,710 B2
(45) Date of Patent: Mar. 2, 2010

(54) BAGGAGE HANDLING SYSTEM

(75) Inventor: Chris Maness, Plano, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 170 days.

(21) Appl. No.: 11/888,295

(22) Filed: Jul. 31, 2007

(65) Prior Publication Data

US 2008/0041696 A1    Feb. 21, 2008

Related U.S. Application Data

(60) Provisional application No. 60/837,772, filed on Aug. 15, 2006.

(51) Int. Cl.
*B65G 39/00* (2006.01)
(52) U.S. Cl. .................................. 198/842; 198/837
(58) Field of Classification Search ............ 198/839, 198/861.3, 837, 842, 812, 592, 593
See application file for complete search history.

(56) References Cited

U.S. PATENT DOCUMENTS 2,360,257 A * 10/1944 Muller et al. ............. 34/266
2,398,148 A * 4/1946 Michna .................... 198/837
3,127,978 A * 4/1964 Zuercher .................. 198/812
5,796,052 A * 8/1998 Christmann ............... 177/145

* cited by examiner

Primary Examiner—Mark A Deuble

(57) ABSTRACT

A baggage handling system includes a first conveyor section having a first conveying surface, a second conveyor section having a second conveying surface with the first conveying surface angled with respect to the second conveying surface, and a conveyor belt extending between the first conveyor section and the second conveyor section. The belt is driven in a conveying direction and includes an upper section defining the first and second conveying surfaces and a lower section extending below the first and second conveying surfaces. In addition, the conveyor belt is configured to extend the first conveying surface over the second conveying surface such that there is no gap between the first and second conveying surfaces in the conveying direction wherein items conveyed on the first conveying surface are deposited onto the second conveying surface.

21 Claims, 8 Drawing Sheets

BAGGAGE HANDLING SYSTEM

This application claims priority to U.S. provisional application Ser. No. 60/837,772 filed Aug. 15, 2006 by applicant Chris Maness entitled BAGGAGE HANDLING SYSTEM, the complete disclosure of which is incorporated by reference herein in its entirety.

TECHNICAL FIELD AND BACKGROUND OF THE INVENTION

The present invention generally relates to a baggage handling system and, more particularly, to a baggage handling system that is configured to share a common belt and drive between two angle conveyor sections.

Two angled conveyors are often connected together by a hitch conveyor section so that the two conveyor sections can share a common conveyor belt and a common drive. With the elimination of unnecessary belts and drives and their associate electrical wiring, controls, and programming, significant savings in costs can be realized. However, the traditional configuration of a hitch conveyor section is such that there is a gap in the conveying direction of the conveying surface where the conveyor belt is extended around the pulleys that redirect the belt from its angular orientation on one conveyor section to its other angular orientation on the second conveyor section. This gap creates a debris accumulation point, which is unacceptable and not permitted in baggage handling system applications.

Accordingly, there is a need for a device that allows two angled conveyor sections to be coupled together so that they can share a common belt and drive to reduce costs but without the attendant problems associated with traditional hitch conveyors.

SUMMARY OF THE INVENTION

Accordingly, the present invention provides a baggage handling system that couples two angled conveyor sections together so that they can share a common belt and drive, while eliminating any gaps in the conveying surface in the conveying direction.

In one form of the invention, a baggage handling system includes a first conveyor section having a first conveying surface, a second conveyor section having a second conveying surface with the first conveying surface angled with respect to the second conveying surface, and a conveyor belt extending between the first conveyor section and the second conveyor section. The conveyor belt is driven in a conveying direction and has an upper section defining the first and second conveying surfaces and a lower section extending below the first and second conveying surfaces. In addition, the conveyor belt is configured to extend the first conveying surface over the second conveying surface such that there is no gap between the first and second conveying surfaces in the conveying direction wherein items conveyed on the first conveying surface are deposited onto the second conveying surface.

In one aspect, the first conveyor section is generally horizontal and the second conveyor section is angled at an incline. Alternately, the second conveyor section may be generally horizontal and the first conveyor section angled at an incline.

In another aspect, the baggage handling system includes a driver, which drives the conveyor belt and moves the upper section of the conveyor belt in the conveying direction.

In yet another aspect, the baggage handling system includes a transition conveyor section, which configures the conveyor belt to extend the first conveying surface over the second conveying surface. The transition conveyor section includes a plurality of redirection pulleys to configure a portion of the upper section of conveyor belt in a generally side-ways S-shaped configuration to extend the first conveying surface over the second conveying surface to provide an overlap between the first conveying surface and the second conveying surface.

In a further aspect, the transition conveyor section further includes a second plurality of redirection pulleys to configure a portion of the lower section of conveyor belt in a generally S-shaped configuration.

In yet a further aspect, the transition conveyor section includes a frame, with the pulleys mounted between and supported by the frame.

According to yet a further aspect, the first or second conveyor section includes the driver. The frame of the driver may have a height generally equal to the height of the frame of the transition conveyor section.

Accordingly, the present invention provides a baggage handling system that achieves a reduction in the number of conveyor belts and devices associated with a conventional hitch conveyor without the debris accumulation points associated with hitch conveyors.

These and other objects, advantages, purposes, and features of the invention will become more apparent from the study of the following description taken in conjunction with the drawings.

DETAILED DESCRIPTION OF THE DRAWINGS

DETAILED DESCRIPTION OF THE PREFERRED EMBODIMENTS

Figures 1, 2:
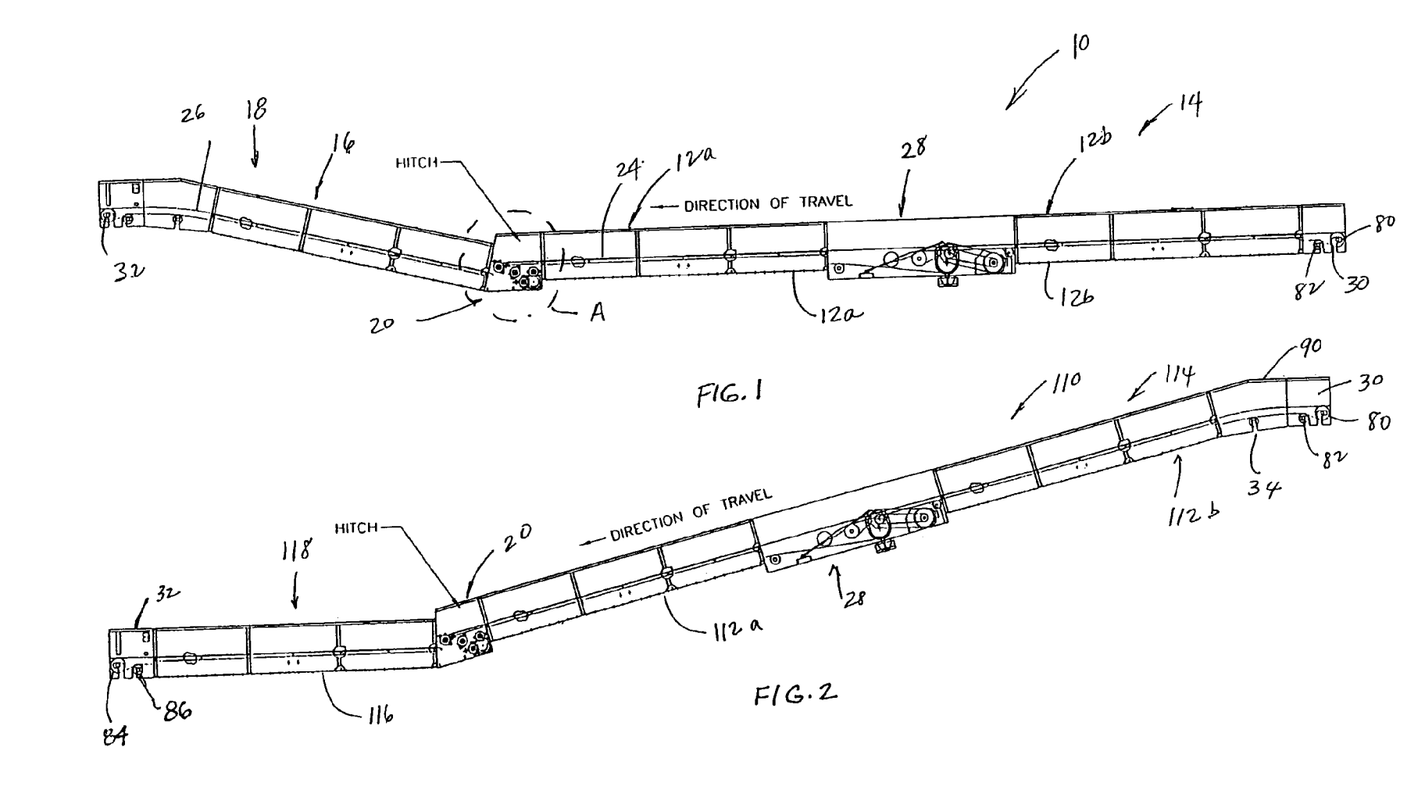
FIG. 1 is an elevation view of a baggage conveyor system of the present invention.
FIG. 2 is an elevation view of another embodiment of the baggage conveyor system of the present invention.

Referring to FIG. 1, the numeral 10 generally designates a baggage conveyor system of the present invention. Baggage conveyor system 10 includes a first conveyor section 14 arranged in a generally horizontal plane and a second conveyor section 18 that is angled with respect to conveyor section 14. Conveyor section 14 may comprise two or more conveyor beds 12a, 12b as illustrated, or a single conveyor bed section. Similarly, conveyor section 18 may comprise a single conveyor bed section 16 as illustrated or may be formed from multiple conveyor beds. Further, the conveyor bed sections may be arranged in any order. As will be more fully described below, baggage conveyor system 10 is configured so that conveyor sections 14 and 18 share a common belt and a common driver, which can result in significant cost savings.

To couple conveyor sections 14 and 18 so that they share a common belt and driver, positioned between the two conveyor sections 14 and 18 is a transition conveyor section 20.

Transition conveyor section 20 allows a single belt and a single driver to be shared by both conveyor sections 14 and 18. Further, as will be more fully described below, transition conveyor section 20 configures the conveyor belt so that the conveying surface 24 of first conveyor section 14 overlaps with the conveying surface 26 of conveyor section 18 so that items that are conveyed on conveying surface 24 are deposited onto conveying surface 26. In this manner, transition conveyor section 20 provides a cascading transition between the respective conveyor sections. Furthermore, transition conveyor section 20 eliminates any gaps in the conveying direction between the two conveying surfaces of the respective conveyor sections.

As noted above, in this illustrated embodiment, conveyor section 14 is oriented in a generally horizontal plane, while conveyor section 18 is angled at an incline with respect to conveyor section 14. For example, conveyor section 18 may be angled at an incline of 14° relative to conveyor section 14. In addition, conveyor system 10 includes a drive assembly 28 between adjacent conveyor bed section 12a and 12b of conveyor section 14, which drives belt 22 around a closed loop between the two conveyor sections. The closed loop is defined between the ends of the respective conveyor sections by a pair of end brackets 30 and 32 and their respective pulleys.

Referring to FIG. 2, the numeral 110 generally designates another embodiment of the baggage conveyor system section of the present invention, which is of similar construction to baggage conveyor system 10. System 110 includes two conveyor sections 114 and 118 that are also joined by transition conveyor section 20, described more fully below, and further are arranged such that conveyor section 114 is angled to provide a decline, such as a 14° decline, to conveyor section 118. For further details of the individual components of conveyor section 110, reference is made herein to baggage conveyor system 10.

Figure 1A:
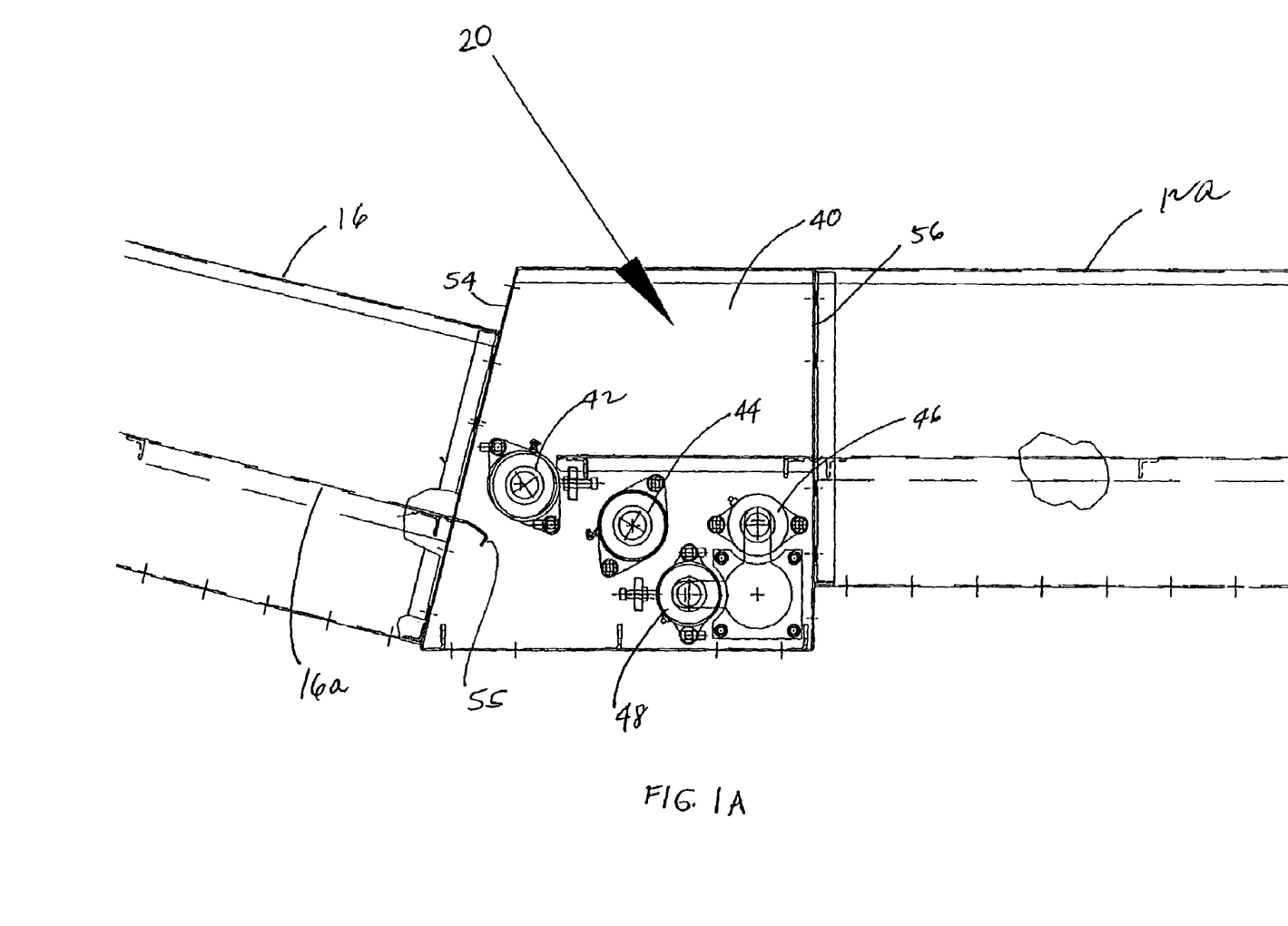
FIG. 1A is an enlarged view of detail A of FIG. 1.
Figure 3:
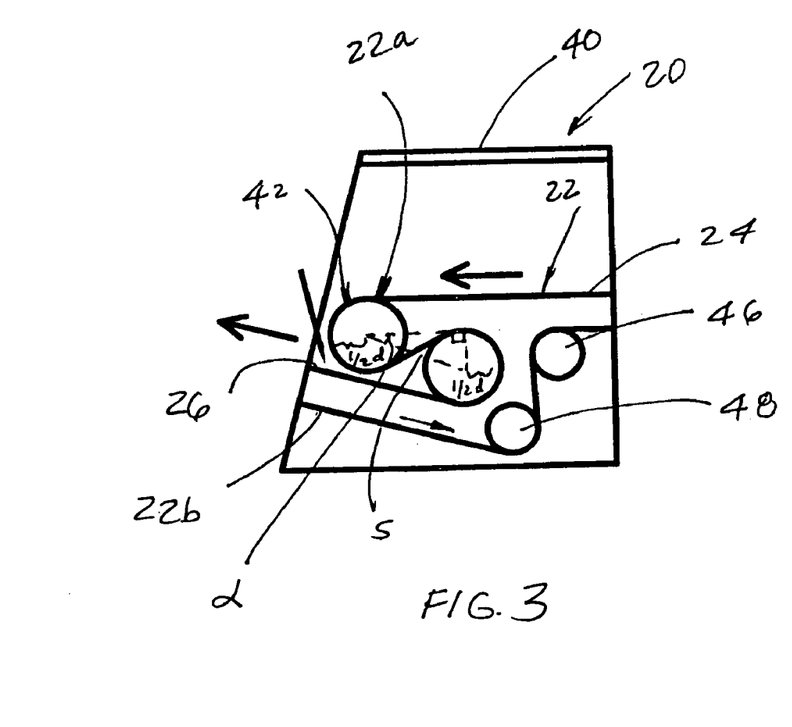
FIG. 3 is a schematic view of a transition conveyor section of the baggage conveyor systems of FIGS. 1 and 2.
Figure 4:
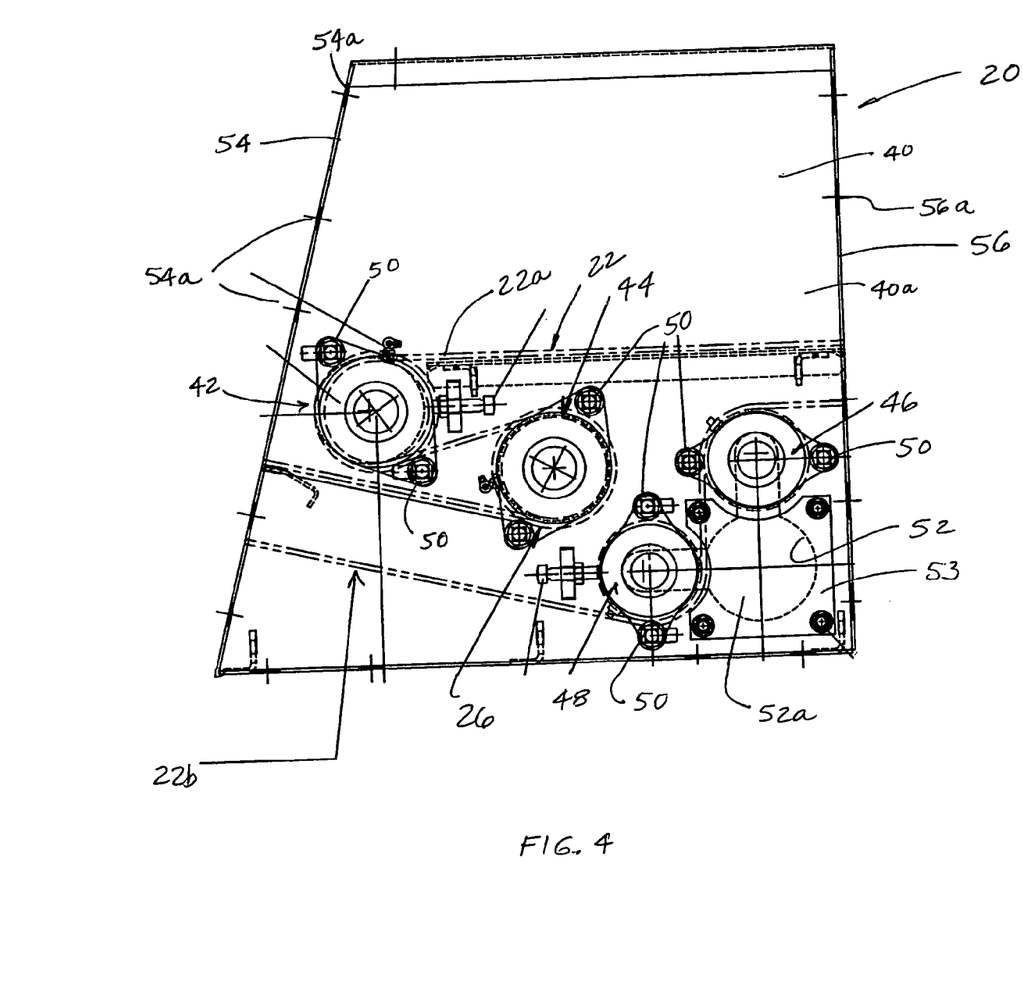
FIG. 4 is an enlarged elevation view of the transition conveyor section of FIGS. 1 and 2.

Referring to FIGS. 1A, 3, and 4, transition conveyor section 20 includes a frame 40 and two pairs of stub pulleys 42 and 44 and 46 and 48. Stub pulleys 42 and 44 redirect the upper section 22a of conveyor belt 22 to form a cascading transition between conveying surface 24 and conveying surface 26. In the illustrated embodiment, stub pulleys 42 and 44 are arranged with the upper roller 42 downstream of lower roller 44 and, further, positioned over lower section 22b of belt 22. In this manner, rollers 42 and 44 redirect conveyor belt 22 into a side-ways S-shaped configuration so that conveying surface 24 overhangs conveying surface 26, for example, by a distance equal to the cosine of angle α (FIG. 3) times the spacing S between stub pulleys 42 and 44 (assuming that curved portions of the belt do not constitute the upper or lower sections of the belt and are instead transition portions). Thus, when items are conveyed on conveying surface 24, the items will be deposited on conveying surface 26 downstream of stub pulleys 42 and 44 with conveying surface 26 conveying the items away from the transition conveyor section.

Similarly, the lower section 22b of conveyor belt 22 is redirected by pulleys 46 and 48 also with a generally S-shaped configuration so as to redirect the lower section 22b of belt 22 into the adjacent conveyor bed section and, further, maintain the overall spacing between the upper and lower sections of the belt in a compact arrangement. For example, as best seen in FIG. 1A, the upper surface of pulley 46 may be generally aligned in a common plane with the upper surface of pulley 70 (FIG. 1 and described more fully below in reference to the drive assembly), which provides a generally parallel belt path through conveyor bed section 12a. Depending on the location of the drive assembly 28, the upper surface of pulley 46 may be generally aligned in a common plane with the upper surface of pulley 82 (also described more fully below) to thereby provide the generally parallel belt path. Similarly, pulley 48 is located below and upstream of pulley 44 so that the lower portion 22b is generally parallel with the upper portion of belt 22, which defines conveying surface 26, through conveyor bed section 16.

Figure 4A:
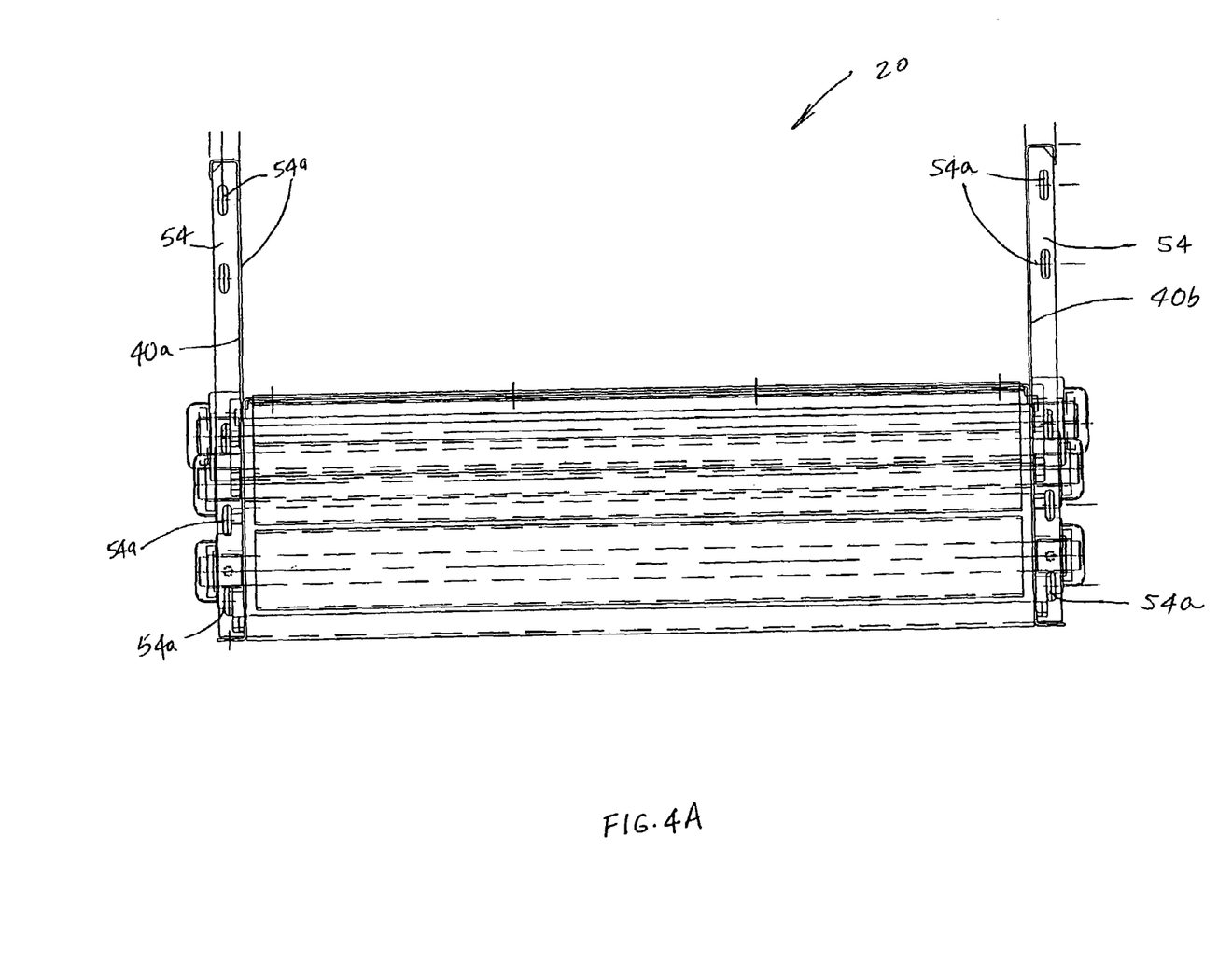
FIG. 4A is an enlarged end view of the transition conveyor section of FIG. 4.

As best understood from FIGS. 4 and 4A, each of the respective stub pulleys 42, 44, 46, and 48 is mounted to the side walls 40a and 40b of frame 40 by mounting bolts 50 (shown in FIG. 4). Further, stub pulleys 46 and 48 are mounted in side walls 40a and 40b in a common slotted opening 52, with the mounting bolts 50 of pulley 48 similarly mounted in slotted openings in side wall 40a to permit adjustment of at least pulley 48. Once positioned in opening 52, a cover plate 53 is provided to cover a central portion 52a of opening 52.

Located at the ends of each side wall 40a, 40b of frame 40 are a pair of mounting flanges 54 and 56, which include slotted openings 54a and 56a, respectively, for receiving mounting fasteners that secure transition conveyor section 20 to the respective conveyor bed sections 12a and 16 of conveyor sections 14 and 18, respectively. With reference to FIGS. 1A and 4, flanges 56 are located along the generally vertical ends of side walls 40a, 40b and are, therefore, generally aligned in a common vertical plane to abut and mount to the end of conveyor bed section 12a. To accommodate the inclined orientation of conveyor bed section 16 relative to conveyor bed section 12a, sides walls 40a and 40b have angled or inclined ends opposed from their generally vertical ends so that flanges 54 are located in an angled or inclined plane to provide angled mounting surfaces that will abut and mount to the ends of conveyor bed section 16.

As best seen in FIG. 1, when transition conveyor section 20 is positioned between conveyor sections 14 and 18, flanges 54 mount to the conveyor bed section 16 and flanges 56 mount to conveyor bed section 12a. Further, conveyor bed section 16 is aligned such that its belt bed 16a is aligned with transition plate 55 (see FIG. 1A), with the lower surfaces of frame 40 of transition conveyor section 20 being generally aligned with the lower surface of conveyor bed section 16; though this will vary depending on the angle of the conveyor section. Bed section 12a is mounted such that its upper surface is generally aligned with the upper surface or end of frame 40. Optionally, the height of frame 40 is commensurate and generally equal to the overall height of drive section 28, described more fully below. In this manner, the entire assembly can be located above the finished floor.

Figure 5:
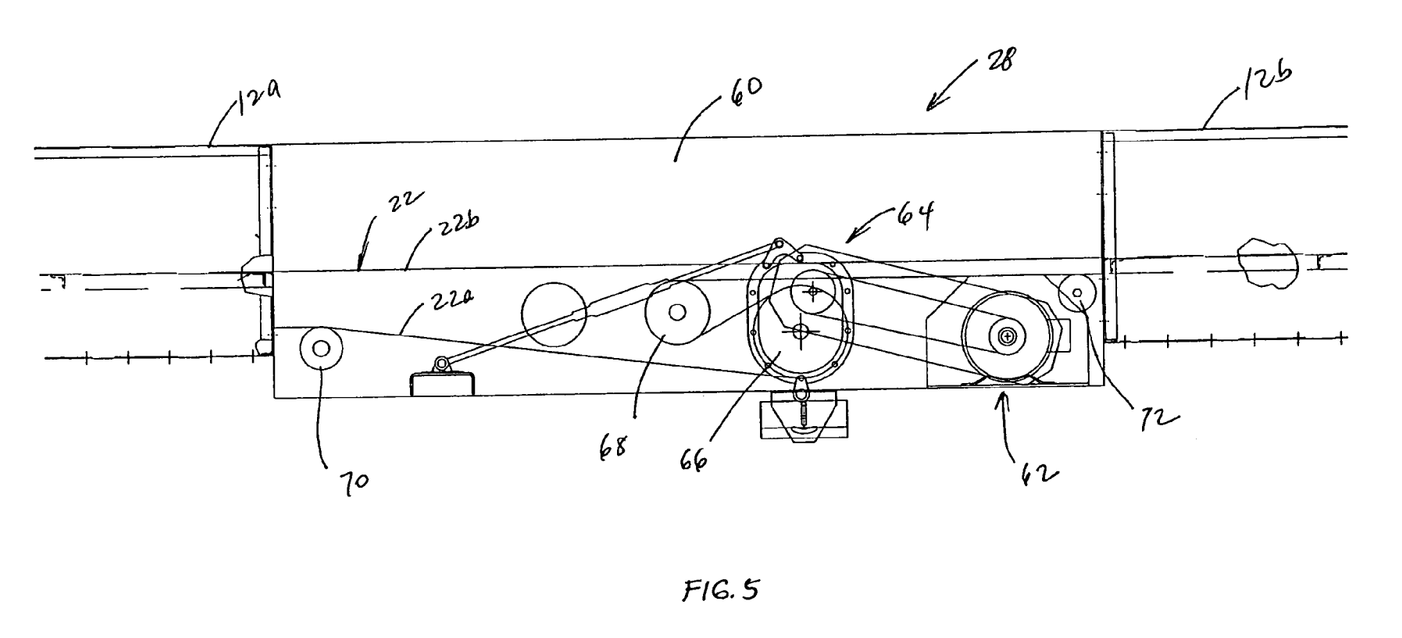
FIG. 5 is an enlarged view of the drive assembly of the baggage conveyor systems of FIGS. 1 and 2.

As best seen in FIG. 5, drive assembly 28 includes a frame 60, a drive motor 62, a gear box 64, and a drive pulley 66. In addition, drive assembly 28 includes a take-up pulley 68 and a stub pulley 70 and a second stub pulley 72, which direct the belt to the adjacent conveyor section. A suitable drive assembly 28 is available from Siemens under the Model No. 9326 Center Drive. It should be appreciated that other drive assemblies may be used without departing from the scope of the invention.

Figure 6:
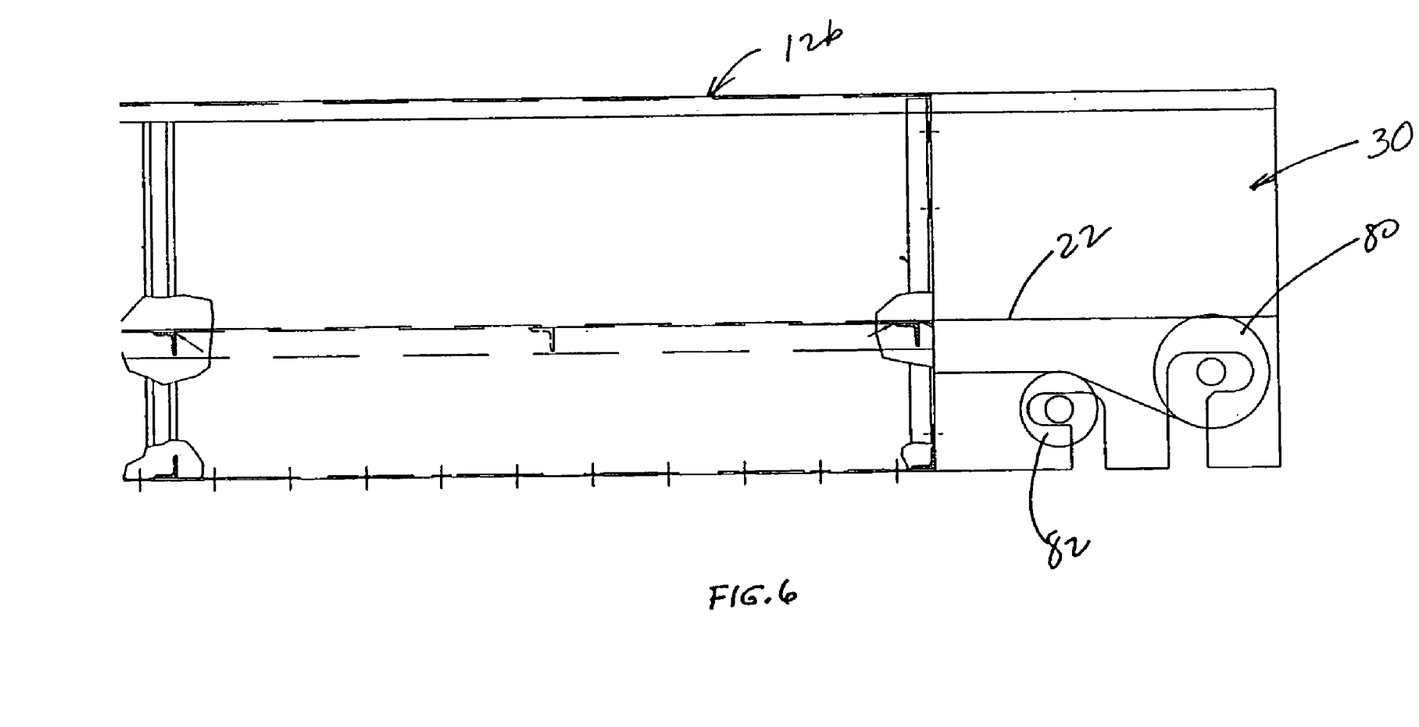
FIG. 6 is an enlarged view of the right end bracket for the end roller of FIG. 1.
Figure 7:
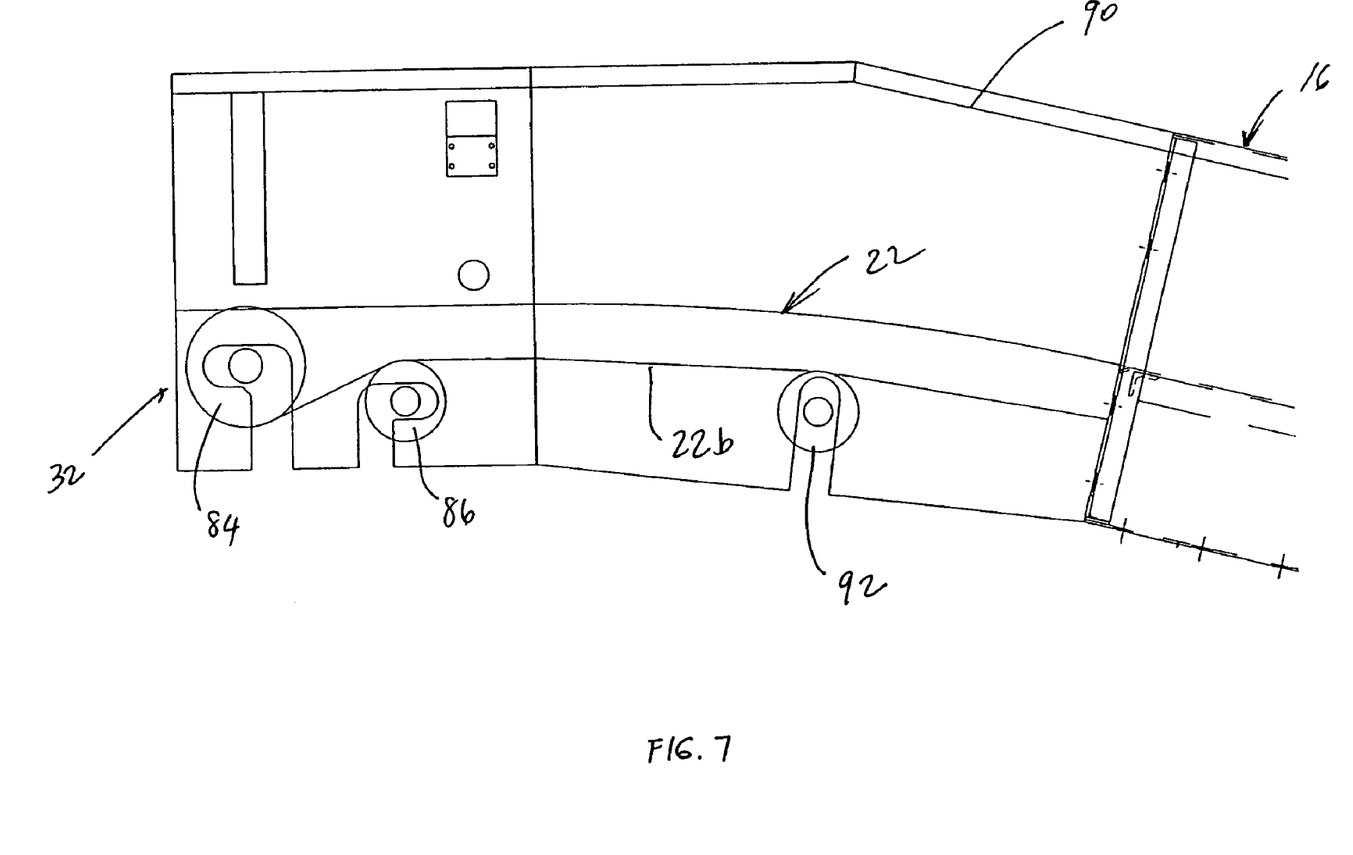
FIG. 7 is an enlarged view of the left end bracket of the baggage conveyor system of FIG. 1.
Figure 8:
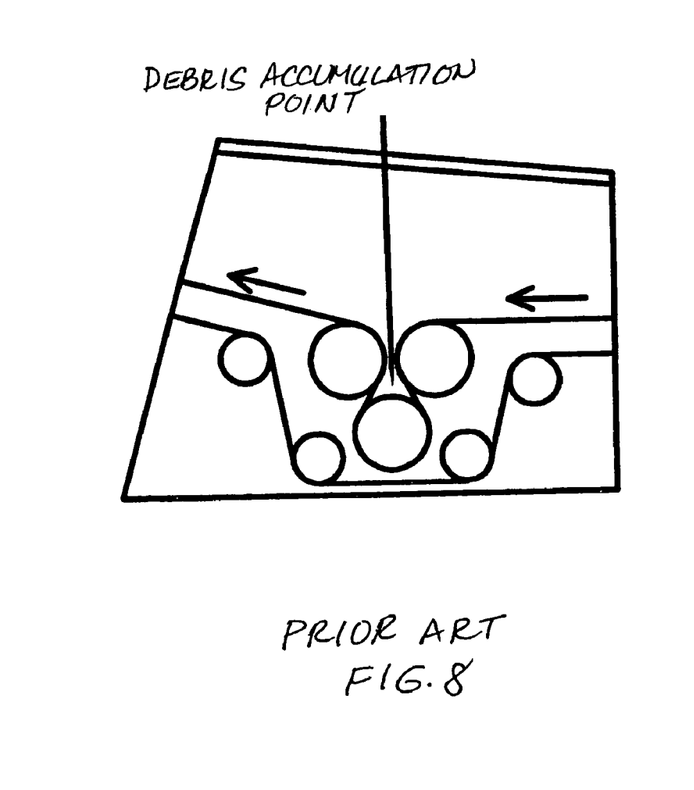
FIG. 8 is a schematic view of a prior art hitch conveyor section.

Referring to FIGS. 6 and 7, conveyor belt 22 extends around end rollers or pulleys 80, 82, 84, and 86, which are mounted by end brackets 30 and 32 to their respective conveyor bed sections. For conveyor section 18, conveyor bed section 16 includes an angled portion 90, which includes a redirection pulley 92 to direct the lower section 22b of conveyor belt 22 from end roller 86 into conveyor bed section 16. As best seen in FIG. 2, for conveyor system 110, conveyor bed section 112b includes an angled portion 90 that includes redirection pulley 92 to direct the lower section 22b of conveyor belt 22 from end rollers 80 and 82 into conveyor bed section 116 to provide the necessary incline between the respective portions of the conveyor system.

As can be appreciated from the foregoing, the transition conveyor section, therefore, provides a cascading transition between the conveying surface of one conveyor section and the conveying surface of another angled or inclined conveying section without any gaps between the respective conveying surfaces of the conveyor sections in the conveying direction. Further, transition conveyor section 20 enables a single belt conveyor belt and a single driver to be used between two adjacent conveyor sections that are angled with respect to each other.

While several forms of the invention have been shown and described, other forms will now be apparent to those skilled in the art. For example, the number of conveyor bed sections forming the conveyor sections may be increased or decreased and may be arranged in any order, without departing from the scope of the invention. Further, the angular orientation of the conveyor bed sections may be varied. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which I claim an exclusive property right or privilege are defined as follows:

1. A baggage handling system comprising:
   a first conveyor section having a first conveying surface for conveying baggage in a conveying direction;
   a second conveyor section fixed relative to said first conveyor section, said second conveyor section having a second conveying surface for conveying baggage in said conveying direction, said first conveying surface inclined with respect to said second conveying surface;
   a conveyor belt extending between said first conveyor section and said second conveyor section and being driven in said conveying direction, said conveyor belt having an upper section defining said first and second conveying surfaces and a lower section extending below said first and second conveying surfaces; and
   a plurality of redirection pulleys configuring said conveyor belt to extend said first conveying surface over said second conveying surface such that there is no gap between said first and second conveying surfaces in said conveying direction wherein items conveyed on said first conveying surface are deposited onto said second conveying surface, and said redirection pulleys being in fixed spaced relationship when said conveyor belt is driven and conveying baggage.

2. The baggage handling system according to claim 1 wherein said first conveyor section is generally horizontal and said second conveyor section is angled at an incline.

3. The baggage handling system according to claim 1 wherein said second conveyor section is generally horizontal and said first conveyor section is angled at a decline.

4. The baggage handling system according to claim 1 further comprising a driver, said driver driving said conveyor belt and moving said upper section of said conveyor belt in said conveying direction.

5. The baggage handling system according to claim 1 further comprising a transition conveyor section, said transition conveyor section configuring said conveyor belt to extend said first conveying surface over said second conveying surface, said transition conveyor section having a plurality of redirection pulleys to configure a portion of said upper section of conveyor belt in a generally side-ways S-shaped configuration to extend said first conveying surface over said second conveying surface to provide an overlap between said first conveying surface and said second conveying surface.

6. The baggage handling system according to claim 5 wherein said pulleys comprise stub pulleys.

7. The baggage handling system according to claim 5 wherein said transition conveyor section includes a frame, said pulleys mounted between and supported by said frame.

8. The baggage handling system according to claim 7, said second conveyor section including said driver, said second conveyor section having one or more conveyor beds, said driver having a frame, said frame of said driver having a height generally equal to the height of said frame of said transition conveyor section.

9. A baggage handling system comprising:
   a first conveyor section having a first conveying surface;
   a second conveyor section having a second conveying surface, said first conveying surface incline with respect to said second conveying surface;
   a conveyor belt extending between said first conveyor section and said second conveyor section and being driven in a conveying direction, said conveyor belt having an upper section defining said first and second conveying surfaces and a lower section extending below said first and second conveying surfaces;
   said conveyor belt being configured to extend said first conveying surface over said second conveying surface such that there is no gap between said first and second conveying surfaces in said conveying direction wherein items conveyed on said first conveying surface are deposited onto said second conveying surface; and
   a transition conveyor section, said transition conveyor section configuring said conveyor belt to extend said first conveying surface over said second conveying surface, said transition conveyor section having a plurality of redirection pulleys to configure a portion of said upper section of conveyor belt in a generally side-ways S-shaped configuration to extend said first conveying surface over said second conveying surface to provide an overlap between said first conveying surface and said second conveying surface wherein said transition conveyor section further comprises a second plurality of redirection pulleys to configure a portion of said lower section of conveyor belt in a generally S-shaped configuration.

10. The baggage handling system according to claim 9, wherein said first conveyor section is generally horizontal and said second conveyor section is angled at an incline.

11. The baggage handling system according to claim 9, wherein said second conveyor section is generally horizontal and said first conveyor section is angled at a decline.

12. The baggage handling system according to claim 9, further comprising a driver, said driver driving said conveyor belt and moving said upper section of said conveyor belt in said conveying direction.

13. The baggage handling system according to claim 9, wherein said transition conveyor section includes a frame, said second conveyor section including a driver, said driver having a frame, said frame of said driver having a height generally equal to the height of said frame of said transition conveyor section.

14. A baggage handling system comprising:
a first conveyor section having a first conveying surface for conveying baggage in a conveying direction;
a second conveyor section being mounted in fixed relationship to said first conveyor section and having a second conveying surface for conveying baggage in said conveying direction, said first conveying surface inclined with respect to said second conveying surface;
a conveyor belt extending between said first conveyor section and said second conveyor section and being driven in a conveying direction, said conveyor belt having an upper section defining said first and second conveying surfaces and a lower section extending below said first and second conveying surfaces; and
a first plurality of redirection pulleys to configure a portion of said upper section of said conveyor belt to extend said first conveying surface over said second conveying surface to provide an overlap between said first conveying surface and said second conveying surface such that there is no gap between said first and second conveying surfaces in said conveying direction wherein items conveyed on said first conveying surface are deposited onto said second conveying surface, and a second plurality of redirection pulleys redirecting a portion of said lower section of said conveyor belt upstream of said overlap toward said upper portion of said conveyor belt forming said first conveying surface.

15. The baggage handling system according to claim 14, wherein said plurality of redirection pulleys configure said portion of said upper section of conveyor belt in a generally side-ways S-shaped configuration to extend said first conveying surface over said second conveying surface to provide an overlap between said first conveying surface and said second conveying surface.

16. A baggage handling system comprising:
a first conveyor section having a first conveying surface;
a second conveyor section having a second conveying surface, said first conveying surface incline with respect to said second conveying surface;
a conveyor belt extending between said first conveyor section and said second conveyor section and being driven in a conveying direction, said conveyor belt having an upper section defining said first and second conveying surfaces and a lower section extending below said first and second conveying surfaces;
a plurality of redirection pulleys to configure a portion of said upper section of conveyor belt to extend said first conveying surface over said second conveying surface to provide an overlap between said first conveying surface and said second conveying surface such that there is no gap between said first and second conveying surfaces in said conveying direction wherein items conveyed on said first conveying surface are deposited onto said second conveying surface;
wherein said plurality of redirection pulleys configure said portion of said upper section of conveyor belt in a generally side-ways S-shaped configuration to extend said first conveying surface over said second conveying surface to provide an overlap between said first conveying surface and said second conveying surface; and
a second plurality of redirection pulleys to configure a portion of said lower section of conveyor belt in a generally S-shaped configuration.

17. The baggage handling system according to claim 16, wherein said second conveyor section is generally horizontal and said first conveyor section is angled at an incline.

18. The baggage handling system according to claim 16, further comprising a driver, said driver driving said conveyor belt and moving said upper section of said conveyor belt in said conveying direction.

19. A method of coupling two conveyor sections, a first conveyor section of the conveyor sections having a first conveying surface for conveying articles in a conveying direction, a second conveyor section of the conveyor sections having a second conveying surface for conveying articles in the conveying direction, said method comprising:
providing a plurality of fixed position pulleys;
extending a belt around the fixed position pulleys to thereby form the first conveying surface for conveying baggage in a conveying direction and the second conveying surface with an upper section of the belt for conveying baggage in the same conveying direction as the first conveying surface;
extending the first conveying surface over said second conveying surface to form an overlapping arrangement with said first and second conveying surfaces such that there is no gap between the first and second conveying surfaces in the conveying direction wherein items conveyed on the first conveying surface are deposited onto the second conveying surface; and
returning a lower section of the conveyor belt under the first and second conveying surfaces and redirecting a portion of the lower section of the belt upstream from the overlapping arrangement upwardly toward the first conveying surface.

20. The method according to claim 19, further comprising providing a plurality of redirection pulleys to configure a section of the belt in a generally side-ways S-shaped configuration to extend the portion of the first conveying surface over the portion of the second conveying surface to provide then overlap between the first conveying surface and the second conveying surface.

21. The method according to claim 19, wherein said extending includes overlapping a first portion of the conveyor belt with a second portion of the conveyor belt wherein a portion of the first conveying surface overlaps a portion of the second conveying surface further comprising maintaining the first portion of the first conveying surface generally horizontal.

* * * * *